June 16, 1936.     H. W. ALDEN     2,044,660
TRANSMISSION MECHANISM
Filed Oct. 20, 1933
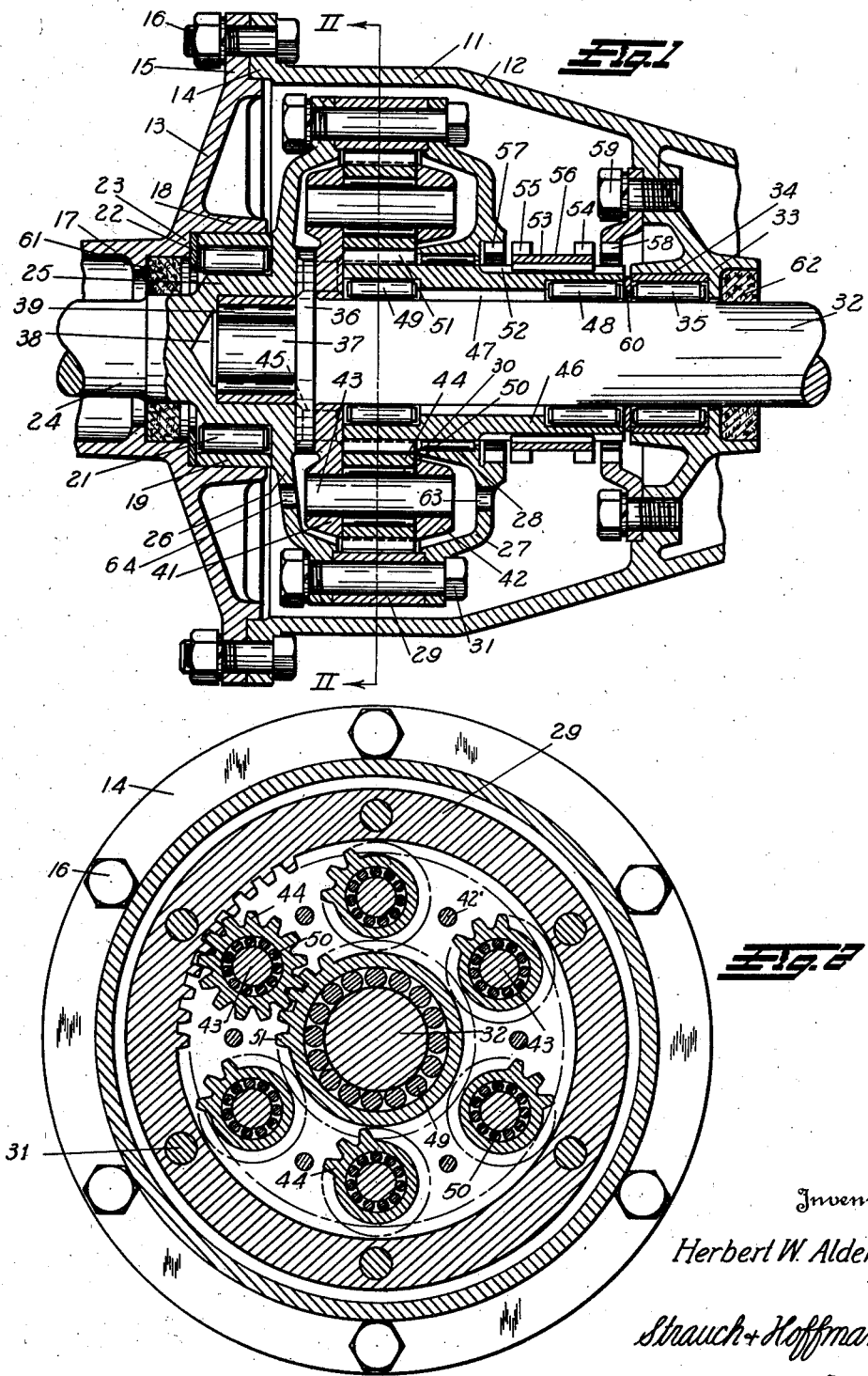
Inventor
Herbert W. Alden
Strauch + Hoffman
Attorneys Patented June 16, 1936

2,044,660

UNITED STATES PATENT OFFICE 2,044,660

TRANSMISSION MECHANISM

Herbert W. Alden, Detroit, Mich., assignor to The Timken-Detroit Axle Company, Detroit, Mich., a corporation of Ohio Application October 20, 1933, Serial No. 694,467

9 Claims. (Cl. 74—290)

This invention relates to speed change transmission devices, and more particularly to such devices designed to be placed in the drive or propeller shaft or utilized in connection with the differential mechanism of an automotive vehicle to increase the range of speeds thereof over the range afforded by the usual equipment.

The manufacture of prior speed change transmission devices of the general type disclosed in this application, has been characterized particularly by a marked lack of attention to the bearing means and associated elements employed therein, the theory supposedly existing that any type of bearing might be employed throughout with equal results in efficiency and durability. However, I have found that this is not the case, and after extensive experimentation have discovered that with the selection of bearing assemblies of certain types and characteristics for different points of bearing supports, improved performance in the operation of speed change transmission devices has been obtained, as regards load capacity, efficiency and long life. Moreover I have found that by simple changes in design of the drive and driven shafts together with the associated bearing elements, I am able to produce highly satisfactory devices at relatively low costs as compared with the cost of production of former devices.

In view of the arrangement and the design of prior bearing assemblies, particularly with regard to the space utilized thereby, it has not been possible to take advantage of specially treated metals to make the transmission elements smaller in size and of thinner material whereby the overall size and weight of the entire unit is reduced and the unit made more compact and efficient for any given load capacity, and providing a minimum addition to the unsprung weight when built into the usual types of unsprung motor vehicle axles for which my improved mechanism is especially adapted.

Accordingly, it is a major object of my invention to provide a speed change transmission device of novel design that is compact, relatively cheap to manufacture and maintain, and is characterized by a high degree of efficiency and durability.

Another object of my invention is the provision of a novel speed change transmission device wherein the elements thereof are maintained in a more steady and compact relation during operation while yet reducing the friction and wearing characteristics of former devices. Steadiness approaching rigidity is desirable in a unit of this type since it unites aligned segments of a propeller or drive shaft and any deviation from its proper position would tend to throw the opposing ends of the shafts slightly out of alignment resulting in an unbalanced unit with excessive vibration.

Still a further object of my invention is the provision of a speed change transmission device of novel design that may be placed on any drive or propeller shaft or associated with a differential mechanism and which is completely bearinged throughout in a manner whereby the unit is maintained substantially rigid or steady and is highly resistant to shocks accompanying the transmission of power, particularly in automotive vehicles while offering but little resistance to the transmission of power therethrough.

Still a further object of my invention is to provide a compact speed change transmission unit that is completely equipped throughout with bearings capable of taking and sustaining heavier loads than heretofore whereby the unit is not only capable of taking heavier loads over relatively long periods of time, but also of transmitting power under such loads at a higher degree of efficiency than previous devices under lighter loads.

Among other objects, my invention contemplates a novel design of a unit of the type described wherein parts not requiring expensive machining or complicated casting methods are employed insofar as possible thus materially reducing the over-all cost of the unit.

Still a further object of my invention is the provision of a speed change transmission unit embodying bearing assemblies in a novel arrangement whereby the elements thereof, particularly those involved in the changing of speeds are maintained in proper alignment, and ready engagement at all times and at all positions of said elements is assured.

A further object of my invention is the provision of a novel speed change transmission unit of more compact design embodying selected types of cageless roller bearing assemblies, particularly of the needle type, in novel arrangement whereby materials of greater strength permitting elements of less size than those hitherto employed may be utilized to reduce the overall size of the unit with no reduction in load capacity.

With the above and other objects in view, reference is made to the accompanying drawing, in which Figure 1 is a longitudinal section of a preferred embodiment of my invention, illustrating in particular the relationship between the drive and driven shafts and the manner of establishing different ratios of power transmission therebetween.

Figure 2 is a sectional view taken substantially on line 2—2 of Figure 1, this view being taken at right angles to Figure 1.

With reference to Figure 1, wherein is illustrated a preferred embodiment of my invention, 11 indicates a housing composed of a bell portion 12 and a cover plate 13. Housing 12 is provided with a flange 14 and cover plate 13 is provided with a flange 15, both flanges having registering apertures therein through which suitable fastening means such as bolts 16 may be passed. Cover plate 13 is formed with a hollow extension 17, and an internally extending flange 18 in approximate alignment therewith. Within flange 18 is mounted a bearing race 19 and a series of bearings 21, preferably of the cageless roller type, the retainer therefor being indicated at 22. Such bearings are preferred since they provide a maximum of load capacity with a minimum of space while materially reducing friction. Flange 18 is provided with an annular abutting portion 23 arranged to hold retainer 22 in position.

A drive or propeller shaft 24 is provided with a machined surface 25 positioned to rotate in bearings 21, and to transmit power to the unit from the prime mover (not shown but which is situated to the left of the illustration). A flange 26 is provided on drive shaft 24, preferably integral therewith, and its outermost portion is provided with openings which register with openings formed in the inwardly extending annular ring 27, provided with a bearing surface 28, at its interior opening. A needle bearing 30 is provided between bearing surface 28 and a sleeve 46 whereby ring 27 is securely supported for rotation with little or no friction at the supporting point. A ring gear 29 is supported between flanges 26 and ring 27 by suitable fastening means such as bolts 31 passing through aligned apertures in the flange and ring.

It will be noted that flange 26 and ring 27 are formed with notches or stepped portions on their opposing faces and gear 29 is of a size to fit exactly therebetween whereby a strong construction is obtained with gear 29 being accurately maintained in position against all stresses to which the unit is subjected.

A driven shaft 32 is provided extending into the right side of casing 11, and substantially in alignment with drive shaft 24. Shaft 32 is supported at one point by a flange 33 provided with a bearing support 34 and a bearing 35, the latter preferably being of the cageless roller type.

A flange 36 is preferably formed integral with driven shaft 32, and an end of reduced diameter is provided on the shaft as indicated at 37. End 37 is received in an opening 38 formed in the right end of drive shaft 24 and is bearingly supported therein by cageless roller bearings 39, which are preferably of the needle type. This type of bearing in the arrangement shown insures a maintenance of the shafts in alignment, this alignment serving to maintain the remaining elements and the unit in their relative positions while increasing the efficiency thereof, particularly as regards the reduction of friction and vibration.

A flange 41 is suitably secured to flange 36 by rivets, bolts or other fastening means 45. A ring 42 is suitably bolted or otherwise secured to flange 41, as by bolts 42 and aligned apertures provided in the flange and ring for the support of pins or spindles 43. Ring 42 may be formed as separate annular segments or it may consist of an annular ring containing a circular row of apertures for pins 43 and provided therebetween with apertures for bolting to flange 41.

Pins or spindles 43 are preferably six in number but it is to be understood that the number may be varied as found desirable. They are preferably pressed into flange 41 and secured as by cotter pins in ring 42 for ease in assembly. Planetary gears 44 are mounted on pins 43 preferably by needle bearings as indicated at 50. Needle bearings are preferred at this point because of their comparatively great strength as compared to their friction reducing characteristics and resistance to wear.

This is explained as being due to the design and manner of operation of needle bearings wherein the needles are of a number and size that an aggregate clearance of slightly less than a whole needle is formed. The needles form a sleeve in combination with the lubricant, which sleeve tends to become an integral sliding unit, the unity being broken only upon the application of a load which causes the needles under load to rotate about their axes. Under a heavy load, the force of the load is not concentrated upon a few needles but is distributed over a substantial number due not only to the lubricant effect but also to deformation of the contacting race, or in the present case, the planet gear.

The needles and lubricant are formed into wedges on opposite sides of the pressure zone by the load application, the extent of the wedges varying to a maximum of approximately ninety degrees on each side of the center of the pressure zone to bring a substantial number of the needles into load supporting contact. Because of the lubricant film, the needles tend to slide and pass from under the point of pressure upon rotation of the planet gears and seek a position of less pressure. They accordingly creep and slide as a unit until the lubricant film breaks down between the needles under pressure and the races so that a sufficient friction factor is developed to cause one or more of the needles to roll about their own axes. Because of the minute variations in needle diameter, lubricant distribution and other factors, a variable creeping of the sleeve of needles with variable rotation of the needles under load occurs. This constant change in position of the needles distributes the wear equally and the life of the bearing is materially prolonged.

Not only does the use of such bearings increase the load capacity of the unit but also reduces the bearing space required on former units. With this reduction in space, it has also been found advantageous to make the gears of lighter and stronger materials, developed by appropriate heat treatments, whereby they and their associated elements may be made smaller to effect an overall reduction in the size of the unit. Since the interior surfaces of the planet gears preferably form the outer races for the needle bearings, less overall space is required for the bearings per se. By reason of such use of the planet gears, they are preferably formed and heat treated so that they may be made in substantially constant relatively thin cross section and will be susceptible to deformations as are desirable for the most satisfactory operation of the needle bearings.

As sleeve 46 is provided concentric with shaft 32 and a clearance provided therebetween as indicated at 47; bearings 48 and 49 being provided to insure free relative motion therebetween, both of said bearings being preferably of the cageless roller type. Clearance 47 restricts contact of the sleeve and shaft only at the bearings provided and insures full access of lubricant thereto. On one end of sleeve 46 is provided a sun gear 51 formed integral therewith or frictionally fitted thereon and adapted to engage planetary gears 44. The opposite end is formed as a splined portion 52, upon which a slide 53 having annular clutch elements 54 and 55 separated by a groove 56 is arranged to slide. Groove 56 may be engaged by forks of conventional design for manual reciprocation of the slide. Ring 27 is formed with an internal annular clutch element 57; and an internal annular clutch element is provided on housing 11 at 58, suitably secured thereto by bolts, such as 59; said clutch elements being provided for engagement with the clutch elements on slide 53 for a purpose to be described. A spacing collar 60 is preferably provided between sleeve 46 and flange 33 to reduce friction and serve also as a retainer for bearings 35 and 48. In connection with bearings 35 and 48, it will be noted that bearing 35 is mounted in housing 12 and hence maintains the immediate portion of shaft 32 in position. Bearing 48 which is next to bearing 35 is maintained in substantially exact alignment with bearing 35 through its contact with shaft 32 and therefore maintains sleeve 46 with slide 53 in correct position as regards housing 12 and clutch element 58. This alignment is important since it insures ready engagement of the clutch element on the slide with the clutch element on the housing. Furthermore, bearings 35 and 48 in conjunction with bearings 21 and 39 at the opposite end of the housing, serve to support the contained elements in a somewhat floating condition whereby they may rotate with the least frictional resistance possible and yet be maintained in their correct relative positions.

Flange 41 is preferably formed distinct from flange 36 on driven shaft 32 and riveted, bolted or otherwise secured thereto for the purpose of economies in manufacture. As illustrated, flange 41 may be made as a simple casting as there are no hardness requirements. If flange 41 were formed as an integral part of driven shaft 32, material costs would be involved, since an upset forging in view of the necessity for a very good grade of steel would be required. This would especially be so in view of the bearing requirements. Not only would such construction be expensive from the rough manufacturing standpoint, but also by reason of the cost of the necessary finishing.

With regard to the manner of operation of the device shown in Figure 1, the ratio of power transmission is dependent upon the position of shifter 53. In the position shown in Figure 1, the transmission is in neutral position and no power is transmitted. When shifter 53 is moved toward the left, causing engagement of clutch elements 55 and 57, ring gear 29 and sun gear 51 are caused to rotate at the same speed, planetary gears 44 being maintained in stationary position as regards their axes, but rotating about the center line of the shafts 24 and 32. Thus drive shaft 24 and driven shaft 32 rotate at the same speed.

When shifter 53 is moved to the right to engage clutch elements 54 and 58, a reduction in speed of driven shaft 32 with respect to drive shaft 24 is obtained. This results from sun gear 51 being held in fixed position through the splined connection of sleeve 46 with shifter 53, in which case, drive is transmitted from drive shaft 24 to ring gear 29 and to planetary gears 44. Planetary gears 44 are forced to rotate by reason of the fixed position of sun gear 51, thus imparting rotation to flange 41 which is secured to drive shaft 32 through flange 36.

Suitable means is provided for lubricating the unit and oil seals are preferably provided engaging drive shaft 24 and driven shaft 32 as indicated at 61 and 62. Openings 63 and 64 are preferably formed in ring 27 and flange 26 respectively to permit the more ready access of lubricant to the planet gears and their bearings. In the construction shown, needle bearings and cageless roller bearings are preferred since it has been found that they are capable of taking a greater load than bearing assemblies previously employed, and permit the manufacture of a smaller and more compact unit. A unit of the type described employing such bearings has been found to perform with greater efficiency over a longer period.

The unit of my invention by reason of its compactness, rigidity and strength may be placed in any type of drive, either of the worm or bevel gear type, as are employed in connection with automotive vehicles.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination with a speed change transmission gear, a casing; drive and driven shafts associated with said casing; selective transmission means within said casing for driving said driven shaft from said drive shaft at different ratios; a ring gear associated with said drive shaft; and planetary gears arranged to engage said ring gear and fixed to rotate with said driven shaft; said planetary gears being rotatably supported on bearings of the needle type, and formed from material susceptible to slight deformation in conjunction with the needle bearings upon the application of load.

2. In combination with a speed change transmission gear, a casing; a drive shaft rotatably supported in said casing; a flange fixed to said drive shaft; a ring gear secured to said flange; a second flange secured to said ring gear with a clutch element thereon; a driven shaft having one end thereof supported in an end of said drive shaft; a flange on said driven shaft; means fixed to said flange to support a plurality of planetary gears arranged to cooperate with said ring gear, said planetary gears being supported through cageless roller bearings; a sleeve rotatably mounted on said driven shaft at a plurality of spaced points, a sun gear on said sleeve; a splined portion on said sleeve; a clutch element fixed to said casing adjacent said splined portion; and a clutch member arranged to slide on said splined portion to connect said sleeve with either of said clutch elements to vary the transmission ratio between said drive and driven shafts.

3. A speed gear transmission device comprising a casing; a drive shaft rotatably supported by said casing; a flange on said drive shaft terminating in an annular stepped portion; a driven shaft rotatably supported by said casing; a sleeve rotatably mounted on said driven shaft; a ring having an inner flange thereon rotatably supported on said sleeve, said ring terminating in an annular stepped portion; and a ring gear adapted to be mounted between said stepped portions and secured to said flange and said ring.

4. A speed gear transmission device comprising a casing; a flange on said casing having a bearing surface; a shaft adapted to be supported by a bearing in said flange whereby it is maintained in alinement with said casing; a sleeve concentric with and spaced from said shaft; a sun gear on said sleeve; a ring rotatably mounted on said sleeve to support a ring gear; and spaced bearing assemblies to rotatably support said sleeve on said shaft, at least one of said assemblies being positioned immediately adjacent said casing flange whereby the respective elements tend to maintain one another in alinement.

5. A speed gear transmission device comprising a casing; a flange on said casing; a drive shaft; roller bearings between said flange and said drive shaft; an annular flange on said drive shaft; a driven shaft; a second flange on said casing; roller bearings between said second flange and said driven shaft; a sleeve concentric with and spaced from said driven shaft; spaced roller bearings for rotatably mounting said sleeve on said shaft, at least one of said bearings being located immediately adjacent said second casing flange; a sun gear on said sleeve; roller bearing means immediately adjacent said sun gear; an annular ring rotatably mounted on said bearing means; a ring gear mounted on said annular ring and said drive shaft flange; a flange integral with said driven shaft; planetary gear supporting means secured to said latter flange immediately adjacent an end of said sleeve; and planet gears thereon to mesh with said ring and sun gears.

6. A speed gear transmission device comprising a casing; a flange on said casing; a drive shaft entering said casing and roller bearings to rotatably support said shaft within said flange; a flange on said drive shaft provided with an annular stepped portion at its outer periphery; a second flange on said casing; a driven shaft entering said casing and roller bearings to rotatably support said shaft within said flange; a sleeve concentric with and spaced from said driven shaft; spaced roller bearings for rotatably mounting said sleeve on said shaft, at least one of said bearings being located immediately adjacent said second casing flange; a sun gear on said sleeve; roller bearing means immediately adjacent said sun gear; a ring rotatably mounted on said bearings and having an annular stepped portion at its outer periphery; a ring gear secured to said ring and said drive shaft flange between said stepped portions; an axial opening in the end of said drive shaft; a portion of reduced cross-section on the end of said driven shaft and roller bearings to rotatably support said portion in said opening; a flange fixed to said driven shaft adjacent said portion; a ring secured to said flange immediately adjacent an end of said sleeve; spindles mounted in said ring; and planet gears rotatably mounted on said spindles by bearings of the needle type.

7. In a planetary gear system, a sun gear, planet gears and a ring gear; and bearings of the needle type for rotatably supporting said planet gears, said planet gears being formed from material susceptible to slight deformation in conjunction with the needle bearings upon the application of load.

8. A speed gear transmission device comprising a casing; a drive shaft entering said casing and roller bearings to rotatably support said drive shaft within said flange; a flange on said drive shaft provided with an annular stepped portion at its outer periphery; a second flange on said casing; a driven shaft entering said casing and roller bearings to rotatably support said shaft within said flange; a sleeve concentric with and spaced from said driven shaft; spaced roller bearings for rotatably mounting said sleeve on said shaft, at least one of said bearings being located immediately adjacent said second casing flange; a sun gear on said sleeve; roller bearing means immediately adjacent said sun gear; a ring rotatably mounted on said bearings and having an annular stepped portion at its outer periphery; a ring gear secured to said ring and said drive shaft flange between said stepped portions; an axial opening in the end of said drive shaft; a portion of reduced cross-section on the end of said driven shaft and roller bearings to rotatably support said portion in said opening; a flange fixed to said driven shaft adjacent said portion; a ring secured to said flange immediately adjacent an end of said sleeve; spindles mounted in said ring; planet gears rotatably mounted on said spindles by bearings of the needle type; a splined portion on said sleeve; a slider upon said splined portion; spaced gears on said slider; an internal gear on said sleeve supported ring and a second internal gear on said casing adjacent said second flange, said slider being movable to selectively engage its gears with said internal gears.

9. A speed gear transmission device comprising a casing; a flange on said casing; a drive shaft; roller bearings between said flange and said drive shaft; an annular flange on said drive shaft; a driven shaft; a second flange on said casing; bearings between said second flange and said driven shaft; a sleeve concentric with and spaced from said driven shaft; spaced bearings for rotatably mounting said sleeve on said shaft, at least one of said bearings being located adjacent said second casing flange; a sun gear on said sleeve; an annular ring concentric with said sun gear and mounted on said drive shaft flange; a ring gear on said annular ring; a flange arranged to rotate with said driven shaft; planetary gear supporting means secured to said latter flange immediately adjacent an end of said sleeve; and planet gears thereon to mesh with said ring and sun gears.

HERBERT W. ALDEN.